J. Shaw, Jr.

Hinge.

Nº 4,641.  Patented July 20, 1846.

UNITED STATES PATENT OFFICE.

JACOB SHAW, JR., OF HINCKLEY TOWNSHIP, MEDINA COUNTY, OHIO.

DOOR-SPRING.

Specification of Letters Patent No. 4,641, dated July 20, 1846.

*To all whom it may concern:*

Be it known that I, JACOB SHAW, Jr., of the township of Hinckley, in the county of Medina and State of Ohio, have invented a new and useful machine or apparatus for closing or shutting and retaining in that position doors, gates, shutters, and other things of like nature to which it may be attached and for forcing and retaining them open when passed beyond a certain point in that direction; and I do hereby declare that the following is a full, clear, and exact description of the same, reference being had to the annexed drawings making a part of this specification, in which—

Figure 3:
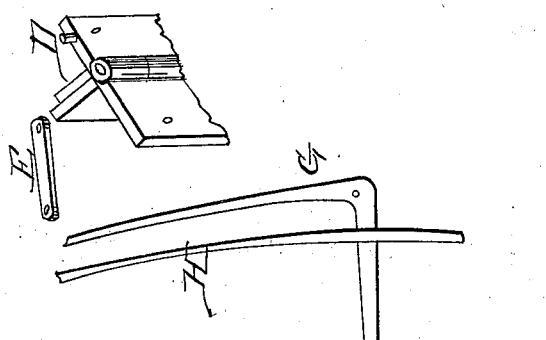
Figure 2:
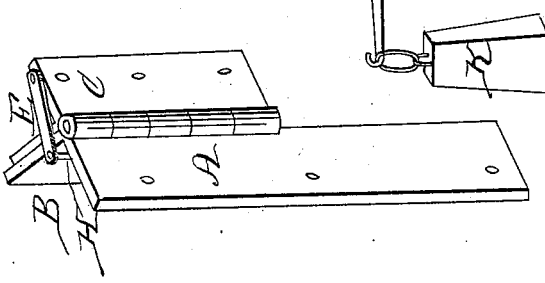
Figure 1:
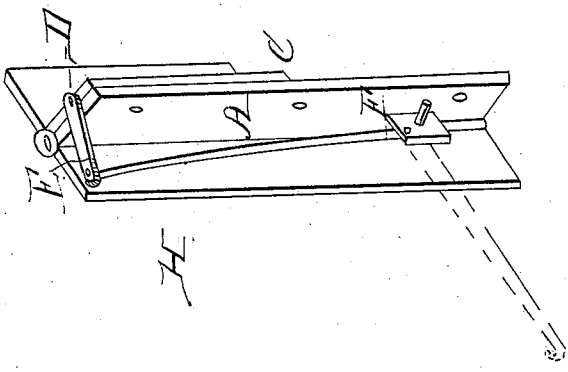

Figure 1 represents a back view of a butt or hinge to which it is attached and by means of which it may be attached to a door, gate, &c., with the wings in contact. Fig. 2 represents a side view with the wings extended, as when a door, gate, &c., to which it is attached, is open. Fig. 3 represents sections or parts to be described hereafter.

A Figs. 1 and 2 represents one wing of a butt or hinge, constructed on the same principle as the common butt or hinge, except its length which is extended to a convenient distance to allow of attaching to it a spring or lever, having a flange B Figs. 1 and 2 attached to, and standing nearly at right angles with it, the face side of which ranges nearly with the center of the eyes of the butt or hinge.

C Figs. 1 and 2 represents the other wing made in the same manner as A B but shorter, having a stud or pivot D Figs. 1, 2 and 3 attached to it, which has a head on its end for the purpose of securing a connecting rod from escaping from it when applied to it and the spring or lever.

On the wing A, at a suitable distance from the flange B to admit a spring of proper dimensions between them, is another flange F Fig. 1. Through the flanges B and F, at the distance from the wing A of about two thirds the diameter of the spring, a hole is made for the purpose of admitting a pin or key, for the purpose of confining the spring in its place.

H Figs. 1, 2 and 3 represents a spring of such dimensions as will possess sufficient power, which may have a notch cut in it in such a position that, when placed in its bed between the flanges and confined by driving a pin or key through the holes in the flanges, it will extend as high as the top of the stud or pivot and on its end is a head similar to that on the stud.

E Figs. 1, 2 and 3 represents a connecting rod having a hole through one of its ends to admit the head of the stud or pivot, and one in the other to admit the head of the spring to pass through.

The parts being confined in their places, one end of the connecting rod placed on the neck of the stud or pivot the other end on the neck of the spring completes the apparatus when the spring is required for its operation.

G Fig. 3 and the dotted lines in Fig. 1 represent a lever attached by means of a pin driven through a hole in the flange B, one in the lever and one in the flange F Fig. 1 one arm of which extends as high from the pin, which is its fulcrum, as the top of the stud or pivot, and on its end is a hook, on which one end of the connecting rod may be placed to connect the lever with the stud or pivot on the wing C, the other arm stands nearly at right angles with that last described, and from its end a weight may be suspended.

K Fig. 3 represents a weight with a ring attached to it for the purpose of suspending it from the arm of the lever.

If the connecting rod be applied to the spring and stud or pivot, and the wing C be moved in the opening direction the spring will be drawn toward the center of motion, progressively coming in contact with the wing A and flange B, (which tends to prevent the fracture of the spring, by causing all parts of the spring to sustain an equal portion of the stress or strain appertaining to it) the end of the spring describing a circular, elliptical or parabolic curve; and if the motion be continued in the same direction until the connecting rod, or a line drawn from the center of the stud to the center of the spring, passes the center of motion the wing will be forced forward by the power until it meets a resisting force which it cannot overcome, bring it back to the point where the connecting rod has passed the center of motion and leave it free, the power will cause the wings to come in contact and retain them in that position.

If the connecting rod be removed from the spring and applied to the lever, and the weight suspended from the other arm thereof, and the wing be moved in the manner described when the rod was in connection with the spring, a similar effect will be produced, and the principle of the operation of the weight and lever power be illustrated.

The several modes in which I have contemplated the application of the principle of the machine or apparatus are: First, by attaching the weight and lever power or spring to butts or hinges in manner as above described, and attaching the butts or hinges to doors, gates, shutters and other things of like nature by one wing, and to the fixture from which the door, gate, &c., will by that means be suspended by the other, &c. Second by attaching the spring or lever to the door, &c., and the stud or pivot to the fixture from which the door, &c., is suspended by means of butts or hinges, or by attaching the stud or pivot to the door, &c., and the spring or lever to the fixture by means of an apparatus constructed on the same principle, and which will be fully represented, delineated and understood, if the wings of the butt or hinge, above described, be considered as deprived of the eyes by which they are connected. Third by attaching the spring or lever directly to the door, &c., or fixture and the stud or pivot to that part of the apparatus to which the spring or lever is not attached by any means which may be convenient not inconsistent with the principle above described; and in all cases connecting the parts by means of a connecting rod in accordance with the principle above specified.

I do not claim generally attaching a spring to a door or hinge in such a manner as to perform the double office of closing the door, and forcing it open according to the position of the door, this having already been done—but What I do claim is—

The particular manner in which I have arranged the spring or weighted lever in combination with the door or hinge for the accomplishment of that object.

JACOB SHAW, Jr.

Witnesses:
 HERVEY LYON,
 JOSIAH PIPER.